June 18, 1968 L. A. CROSS, JR 3,389,242
CODED ELEMENT AND MEANS FOR USE THEREWITH
Filed June 4, 1963 2 Sheets-Sheet 1
FIG. 1
| DIGIT | CHANNELS | | | | |
|---|---|---|---|---|---|
| | 1 | 2 | 4 | 8 | C |
| 1 | X | | | | X |
| 2 | | X | | | X |
| 3 | X | X | | | |
| 4 | | | X | | X |
| 5 | X | | X | | |
| 6 | | X | X | | |
| 7 | | | X | X | |
| 8 | | | | X | X |
| 9 | X | | | X | |
| 0 | | X | | X | |
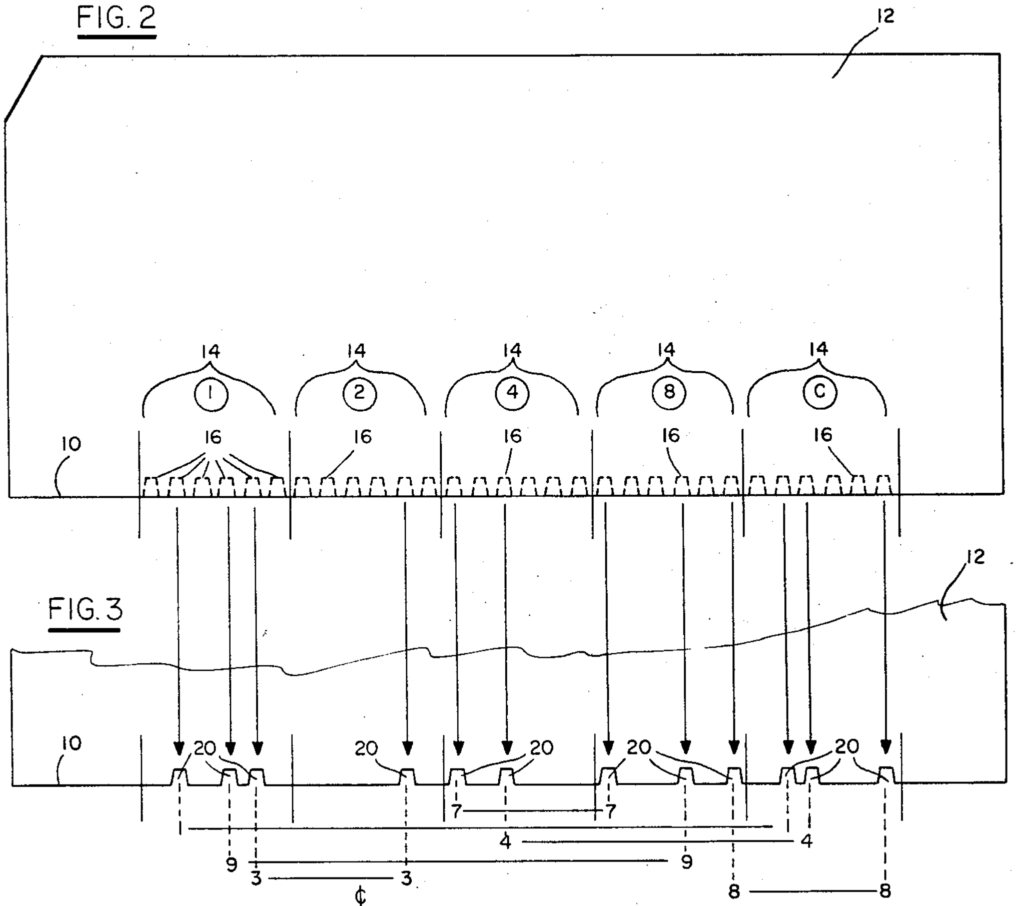
FIG. 2, FIG. 3
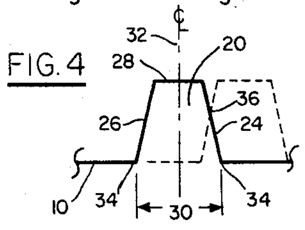
FIG. 4
INVENTOR.
L. ALLAN CROSS Jr.
BY Albert Sperry INVENTOR.
*L. ALLAN CROSS Jr.*
BY
*Albert Sperry.*

United States Patent Office 3,389,242

Patented June 18, 1968

3,389,242
CODED ELEMENT AND MEANS FOR USE THEREWITH

Laurence Allan Cross, Jr., Lambertville, N.J., assignor, by mesne assignments, to Randomatic Data Systems, Inc., Trenton, N.J., a corporation of New Jersey
Filed June 4, 1963, Ser. No. 285,336
11 Claims. (Cl. 235—61.12)

ABSTRACT OF THE DISCLOSURE

A coded information-carrying element includes a plurality of zones correspondingly subdivided into code locations. The number of locations per zone represents the maximum number of indicia occurring in the coded information, while the order of locations in each zone represents the *order* of the characters. Selected zones are grouped to code a selected indicium. The indicium is thus coded, and its order in the complete series of indicia is established by applying punch marks or other identification to corresponding locations of the zones grouped to represent that indicium.

This invention relates to data processing code systems adapted for use in identifying data processing cards or other information-carrying elements, and to data processing code system as used in code oriented equipment that will read or otherwise process the cards to which such a code is attached. The invention further relates to a particular shape or configuration of edge punched notch that may be used to represent a code.

Many methods of coding cards or information-carrying elements have been used heretofore, such as columnar punching, edge hole punching, magnetic imprinting, and so forth. Such methods of coding have been designed for usage in equipment that is appropriate for the reading and processing of particular code systems. In addition, many previous types of notches as punched along an edge of a card have caused or have tended to cause interlocking of two adjacent cards when said cards are stacked or moved laterally across the face of each other, as is common practice in many business and data processing machines.

In accordance with the present invention, a new and novel method of coding cards or information-carrying elements is provided that is appropriate for usage in special data processing equipment designed for this type of code system. The invention further may be employed, if desired, with a particular type and unique configuration for a notch punched in an edge of a card or other information-containing element, and which serves to eliminate the normal tendency for interlocking of two adjacent cards to take place when one card is slid across the face of another. This feature considerably enhances the value of edge notched cards as information-containing media for automatic handling in data processing equipment.

A card or other information-carrying element embodying a code system in accordance with the present invention can be made of any substance, such as paper, plastic, film, metal, etc. Such cards are useable for the purpose of recording any types of information by any process, such as writing, typing, punching, magnetic, embossed, photography, etched or otherwise.

This invention particularly relates to code systems and control systems designed for the handling and processing of information-carrying cards adapted to be employed in performing a wide variety of functions. For example, the code system may serve as a means for identifying a particular card or group of cards. Thus, in any system incorporating six digits, four of the six digits may be common to several cards while two of the six digits may be particular to individual cards. In accordance with the present invention, the code system can readily select or classify major card groups or it may be employed to select or specify a specific and particular card.

Accordingly, one of the objects of this invention is to provide a new and unique code system represented by holes, notches or other elements which may be arranged along one or several edges of a card or other information-containing element. Such a code system is specifically designed for effective and convenient operation in machines appropriate for the reading or otherwise processing cards or elements conforming to said code.

Another object of this invention is to provide cards having notches formed therein in such a manner as not to interfere in any way with any information stored in any manner on the card.

It is a further object of this invention to notch any type of data processing cards, such as tabulating cards, microfilm cards, magnetic cards, etc., so that said cards can perform the original functions in appropriate machines for which they were designed without interference.

An additional object of this invention is to provide a system of coded edge holes or notches in a card or media, said holes or notches being of any desired size, shape, form, or dimension—round, rectangular or any variation thereof, spacing of such holes or notches may be of any practical dimension to correspond with the requirements of any particular system.

It is also an object of this invention to have each code hole or edge notch of such a design and configuration as to permit one card to slide across another, such as would be the case in certain automatic feeding devices now in use, without having the notches lock, thereby locking two or more cards together.

It is an object of this invention to provide a system of encoding unique unto itself thereby permitting such a coded card to be more easily used in certain types of equipment incorporating this particular code structure in their operations.

It is an object of this invention to provide a code reading or translation device that will permit easy reading of the notches in an edge of a card and translate the notches into meaningful character representation, without requiring the user of said device to have knowledge of the said code structure.

These and other objects, features, and advantages of the invention will appear from the following description thereof, wherein reference is made to the accompanying drawings, which illustrate typical forms of the invention, for the purpose of indicating the nature of the invention, but without intending to limit the invention thereto.

In the drawings:

FIG. 1 is a chart representing a typical form of code which may be utilized in the practice of the present invention;

FIG. 2 is a plan view of a typical card which may be encoded in accordance with the present invention;

FIG. 3 illustrates a portion of the card shown in FIG. 2 with code elements embodied therein;

FIG. 4 is an enlarged view of a portion of the coded card of FIG. 3;

Figure 5:
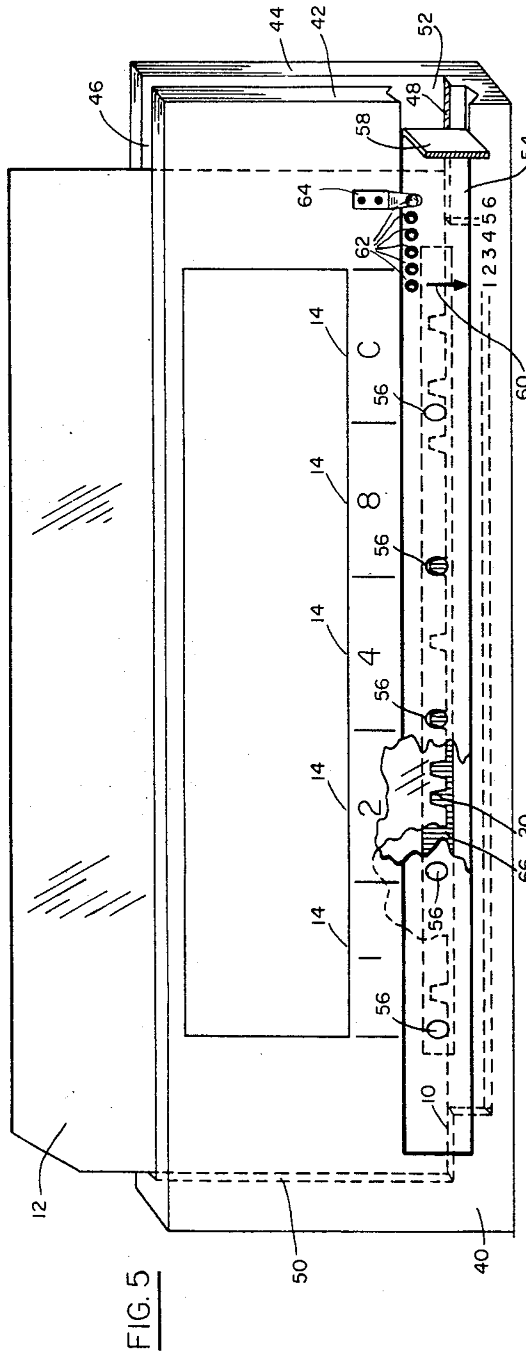
FIG. 5 is a diagrammatic illustration of a typical form of code reading equipment adapted for use in verifying or reading cards which have been coded in accordance with the present invention.

In that form of the invention chosen for purposes of illustration in the drawings, the cards or elements to be encoded are provided with code means characterizing any of a great number of code systems. However, the particular code system preferred and herein described is a five channel modified binary code system employing two channels for identification of a single character, such as any number from 0 to 9. For this purpose, as shown in the chart of FIG. 1, zero may be designated by characters located in positions corresponding to channels 2 and 8 on the chart. The number one can be designated by characters located in positions corresponding to channels 1 and C on the chart. In a similar way, each of the remaining numbers from two to nine can be designated by a different pair of channels, as shown in the chart of FIG. 1.

It is, of course, understood that other code systems may be used in the practice of the present invention depending upon the number of channels and characters desired or required for encoding the information to be impressed on or imparted to the information or data carrying card or element employed.

In accordance with the present invention and in a preferred application thereof, as shown in FIG. 2, each card in a file containing up to 999,999 cards can have a different coded number imparted thereto in the form of notches located in one edge of the card. For this purpose, the edge 10 of the card 12 can be divided or marked off into a plurality of relatively wide zones or areas 14 corresponding in number to the number of channels used in the code employed. Thus, as shown in FIG. 2, five such zones 14 are provided, and for the purpose of the present description, they are marked 1, 2, 4, 8 and C to correspond with the five channels of the code chart of FIG. 1. The zones 14 may then be subdivided into locations 16 corresponding to the number of digits required for encoding all of the cards in a file. Thus, six locations 16 will be provided in each of the zones 14 along the edge 10 of the card 12 when any number of cards up to 999,999 cards are contained in a file. If the invention is to be used with a card file containing no more than 99,999 cards, it will not be necessary to use more than five digits to identify each card. Only five locations 16 then need be provided in each zone 14. Of course, if a greater or lesser number of digits are required for any application of the present invention, the number of locations 16 in each zone 14 should be correspondingly increased or decreased.

In using a card or data carrying element such as that of FIG. 2 with the code system represented in FIG. 1 to encode the card with any number up to one having six digits, a notch is formed in the edge 10 of the card in the first location 16 of each of the two zones 14 of the card required to represent a desired number. In a similar way, a notch is made in the second or adjacent location 16 of each zone 14 as required to represent a second number. Other numbers can then be represented by notches in the other locations of the zones 14 whereby the position and arrangement of the notches 20 in the edge 10 of the card can be varied to represent any number from 1 to 999,999.

In order further to illustrate the application of the invention to a card, attention is directed to FIG. 3 wherein the notches 20 serve to represent the number 714,938. Referring to the chart of FIG. 1, it will be noted that the number 7 may be represented by characters in the zones identified as 4 and 8. The card 12 accordingly has notches 20 in the locations 16 adjacent the left side of the zones 14 identified as 4 and 8. None of the other zones 14 are notched in this first or left hand extremity with the result that the notches formed in such first locations 16 can only represent the digit 7.

Since the second digit of the number 714,938 is one, which corresponds to the presence of characters in the zones 1 and C of the code chart of FIG. 1, the card of FIG. 3 has notches 20 in the second location 16 from the left in each of zones 1 and C and in no others of the zones 14. In a like manner, notches 20 are formed in the third location 16 of only the zones 4 and C to represent the digit 4, as shown in the chart of FIG. 1. The notches in the fourth locations of zones 1 and 8 represent the digit 9, the notches in the fifth locations of zones 1 and 2 represent the digit 3, and the notches in the sixth location of each of the zones 8 and C represent the digit 8.

A card or element thus encoded can be readily selected from any other card in a file by card selecting equipment, such as that shown and described in United States Patent No. 3,292,631 issued to me on December 20, 1966. Moreover, if all cards ending in the three digits 485 or all cards from 2000 to 2999 or any other group of cards having the same digit or group of digits in the same location are required, they can be selected from a file of such cards by reason of the similar location and arrangement of the notches in the cards to be selected.

In forming the notches 20 in the edges 10 of the cards to encode the cards, it, of course, is not necessary to progress from one location 16 to an adjacent location or to proceed from the left to the right as illustrated in FIG. 3 and the foregoing example. The notches may instead progress from right to left or they may be otherwise arranged within the various zones in any consistent manner, such that the position and arrangement of the notches in all of the zones 14 is determined in the same manner. In any case, as pointed out above, the number of the zones 14 provided should correspond to the number of channels employed in the code employed and the number of locations 16 within each zone should ordinarily correspond to the number of digits, symbols or characters desired in effecting the complete encoding of the card or element 12. Nevertheless, if some particular code embodies a separate channel in which a limited or different number of symbols or characters are utilized for a special reason, the number and position of the locations 16 utilized in a zone 14 corresponding to such separate channel may be varied.

While the zones 14 and locations 16 used in the encoding of a card or element 12, as shown in FIG. 3, are located on one edge of the card, some of such zones and locations can be located on the ends or upper edge of the card if desired or necessary. It is, therefore, possible to use a relatively large number of encoding notches or the like or to employ notches which are of suitable size and shape or so spaced as to adapt the coded cards or elements for use with various types of equipment.

A preferred form of the notches 20 employed in the encoding of cards or other information-containing elements is illustrated in FIG. 4. As there shown, the notch 20 is in the form of a truncated isosceles triangle having oppositely and similarly inclined sides 24 and 26. The upper or inner edge 28 of the notch may be arcuate or rounded, but preferably is parallel to the edge 10 of the card and substantially shorter than the width 30 of the notch adjacent the edge 10 of the card. At the same time, the inclined sides 24 and 26 of the notch are spaced equal distances from a center line 32 passing through the notch at right angles to the edge 10 of the card and the inner edge 28 of the notch 20.

With this construction, the sloping sides 24 and 26 of the notch assure proper centering and positioning of the cards with respect to any element or member which they may engage in use. Thus, even though any card should be somewhat displaced within a file of cards, the relative movement of a member and card to effect the engagement thereof will result in the centering and proper registration of the card and member for whatever further movements or uses thereof which may follow. Moreover, the engagement of a member with either or both of the inclined sides 24 and 26 of the card will leave the corners 34 of the notches 20 untouched so that bending, displacement or injury to the corners of the notch or the adjacent portions 10 of the card will not occur. The cards or information-carrying elements will, therefore, be preserved without injury or deformation and will have a longer useful life than cards or elements wherein the coded notches are otherwise formed.

A particular feature and advantage of coded cards or elements embodying the present invention wherein the notches 20 are formed with inclined sides 24 and 26, as shown in FIG. 4, resides in the ability of the cards to slide over or between the surfaces of adjacent cards. This result arises from the fact that the cards do not present parallel or right angularly extending sides which can become interlocked or form abutments which will interfere with the movement of one card over another. Such movement instead will result at most in the movement of an inclined side 24 of a notch 20 on one card into contact with an oppositely inclined side 26 of a notch on an adjacent card. Therefore, even if the corners 34 of a card or the portion of an edge 10 of a card between two notches 20 should be bent or displaced from the plane of the card 12, the engaging, but inclined, edges 24 and 26 of the notches on the cards will contact at a single point only, as indicated at 36 in FIG. 4. Such contact will not prevent sliding of one card over another, but will serve to move the deflected or bent portion of a card back into the plane of the card or to allow one card to ride up over the deflected portion of another card.

In this way, the coding of cards or elements assures the desired freedom of relative movement of the cards in a file or with respect to each other and aids in assuring proper registry of any and all cards with respect to members engageable with coded notches in the cards.

In many instances, it is necessary or desirable to read or translate the coded cards or information-carrying elements or to verify the correctness of the code-embodying notches 20 in the edges of a card. For this purpose, a simple form of card reading device, such as that shown in FIG. 5, may be employed. As there shown, the device embodies a card holder 40 having a front plate 42 and a rear plate 44 spaced apart to provide a card receiving recess 46. The bottom of the recess 46 is formed by a card-supporting surface 48 and the left hand end of the recess 46, as seen in FIG. 5, is provided with a vertical abutment end 50 against which the end of a card may be positioned. A card 12 to be read can then be inserted vertically or horizontally into the recess 46 with the coded edge 10 thereof resting upon the card-supporting surface 48 and can be moved into engagement with the abutment 50 so as to be accurately positioned within the recess 46.

The front plate 42 of the device is provided with a horizontal slot 52 extending lengthwise of the recess 46 adjacent the bottom thereof so that the lower coded edge 10 of the card is exposed by the slot 52. However, a slide 54 is positioned within the slot 52 in front of the coded edge of a card 12 in the recess 46 and provided with openings 56 therein affording inspection of only those portions of the edge of card 12 exposed through the openings 56. The latter openings are spaced apart longitudinally of the slide 54 so that each opening 56 is positioned opposite one of the zones 14 of the card to be inspected and in front of the same location 16 in each zone of the card. Thus, when the slide 54 is in the left hand position, as shown in FIG. 5, with the end of the slide in engagement with the end of the slot 52, the openings 56 in the slide will be opposite the first or left hand location 16 of each of the zones 14 of the card 12.

The slide 54 has a handle or finger piece 58 thereon for moving the slide lengthwise within the slot 52 and an arrow or index point 60 is marked on the slide 54 to indicate which of the locations 1 to 6 as marked on the front of the card holder 40 is being inspected within the zones 14. If desired, the slide also may be provided with detent depressions 62 engageable by a spring detent 64 to yieldably hold the slide in any position to which it may be moved.

While the presence or absence of a notch 20 in the card 12 being inspected may be determined by observation through the openings 56 in the slide 54, such observation is preferably aided by placing or locating means such as a light, color strip, or the like behind the card 12 so that it will be exposed or visible when a notch 20 in the card is located behind the opening 56 in the slide. For this purpose, a colored strip of material 66 may be located in the recess 46 adjacent the bottom thereof and on the back plate 44 of the device. In this way, the presence or absence of a slot 20 in any location 16 of any zone 14 of a card will be made readily apparent. Moreover, by shifting the slide 54 lengthwise to bring the openings 56 corresponding to each zone 14 into registry with each location 16 in each zone, the coded characters identifying the card being read or inspected can be fully deciphered.

Figure 6:
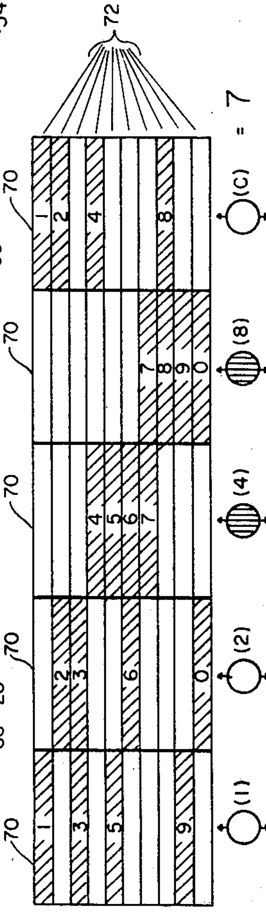
FIGS. 6 and 7 illustrate typical charts which may be employed with the equipment of FIG. 5.

In reading a card with the device of FIG. 5, a chart, such as that shown in FIG. 6, may be used. Thus, the chart of FIG. 6 is divided vertically into five zones 70 corresponding to the five zones 14 of the card of FIG. 3 and the five channels of the chart in FIG. 1. The zones 70 are, in turn, divided horizontally into ten areas 72 numbered from zero to nine. Those areas 72 which are in the same horizontal plane will then be seen to identify one of the numbers in the chart of FIG. 1. Areas 72 can be colored or otherwise given a characteristic appearance which may be similar to that of the colored strip 66 of the device of FIG. 5, and have the number therein which is represented by those two areas 72 which are in the same horizontal plane.

In using the chart of FIG. 6 with the device of FIG. 5, a card to be read is placed in the recess 46 with the coded notches positioned in front of the colored strip 66. The slide 54 is then moved to the position corresponding to the first location 16 of the zones 14 of the card whereupon the notches positioned adjacent the openings 56 in slide 54 will serve to expose the colored strip 66 through certain of the openings 56 in the strip. If the first number identifying the coded card is 7, as in the example cited above, the colored strip 66 will be exposed through the openings 56 in zones 4 and 8 of the slide 52. The reader can then turn to the chart of FIG. 6 and note that the correct zones are exposed by the notches in the card being examined and that the number represented is seven. Thereafter, the slide 52 is moved to the number two location whereby the notches 20 in the card 10 will serve to expose the color strip 66 in zones 1 and C and the reader, by referring to the chart of FIG. 6, can see that the number represented is one and the notches 20 are properly positioned in the card. Other digits of the number representing the card can be read in a similar way. It should be noted that the chart of FIG. 6 can be mounted on the front plane 42 of the card holder 40, matching zones 70 of the chart with zones 14 of the card holder, for convenient reading.

In this way, the card inserted in the device 40 can be quickly and easily read or verified; whereas, the reader need have no knowledge of the code employed or have any special skills in the reading or interpretation of codes.

Figure 7:
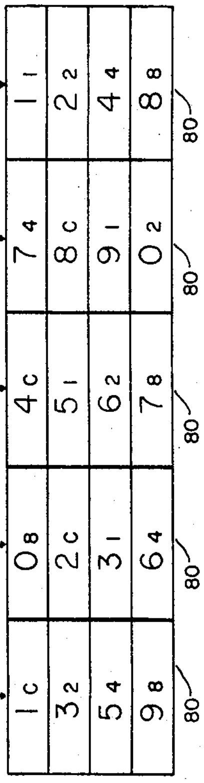

In the alternative, if desired, a reading or verifying chart, such as that shown in FIG. 7, may be employed. For this purpose, the chart may be divided into vertical zones 80 corresponding in number to the number of channels employed in the code used to identify the cards to be read. However, only four vertical divisions are required in each zone and each division provided with a large number and a smaller number or letter. The larger of these two numbers indicate the number represented when the color strip 66 of the device of FIG. 5 is exposed in both that channel and the channel of the smaller number or letter.

In using such a chart, the reader in the example previously used will find the color strip exposed in the zones 4 and 8 to represent the number seven when slide 52 is in its first location. Upon looking down the columns of zone 80 of the chart of FIG. 7, which are in the zones 4 and 8, the reader will find that the large number 7 is in each column and the smaller number indicating the other column in which the strip 66 should be exposed. As a result, the correct location of the notches 20 in the card can be verified rapidly and the card read by persons having no knowledge of the code system used.

The coding system and the cards or information carrying elements, as described above, as well as the card-reding device and charts employed in the practice of the present invention are capable of many changes, variations, and modifications. Thus, they can be employed in combination with code systems having any desired or necessary number of channels and for representing and reading numbers, words, or characters having any number of digits, letters, or elements. Moreover, the form and shape of the cards and the notches therein and the arrangement of the notches in the card are capable of numerous changes and variations. In view thereof, it should be understood that the particular embodiments of the invention shown in the drawings and described above are intended to be illustrative only and are not intended to limit the scope of the invention.

I claim:

1. A coded card having code elements in an edge thereof representing a number as defined by the elements of a multiple channel binary code system, said edge of the card being divided into a number of zones equal to the number of channels employed in said code system and each of said zones being provided with a number of adjacent code element receiving locations corresponding to the number of digits in said number, said code elements being arranged in said edge of the card so that there are two and only two of said zones which have code elements positioned in any similar location therein.

2. A coded card of the character defined in claim 1 wherein the code elements consist of notches.

3. A coded card of the character defined in claim 1 wherein the code elements consist of notches in the form of truncated triangles with the bases of the triangles adjacent said edge of the card.

4. A device for reading a coded card having notches formed in an edge thereof and defining code elements, said device comprising positioning means for locating the notched edge of the card in a predetermined position, identifying means positioned to be exposed through the notches in the edge of the card, and a slide movable parallel to said edge of the card on the side of the card opposite to that on which the identifying means is located, said slide having a plurality of spaced openings therein registerable with notches in the card which are in similar locations in different zones of the card whereby the identifying means may be seen through those openings registering with code representing notches in the card.

5. A coded information carrying member having means thereon for representing any of a plurality of multiple part characters, said means being divided into multiple zones representing individual code channels each of said zones being subdivided into a plurality of code receiving locations, the number of said code receiving locations in a zone being equal to the number of times the individual code channels may be used in representing said multiple part characters.

6. A coded member having code elements applied thereto representing characters made up of a plurality of parts as defined by a multiple channel code system, the code elements applied to said member and representing each multiple part character applied to the member being divided into a number of groups corresponding to the number of channels employed in the code system, said groups of code elements including available locations equal in number to the number of parts embodied in the characters represented by the code elements applied to said member.

7. For use in apparatus of the data-processing type, an information-carrying card element coded to signify a particular group of characters the total number, order, and intrinsic nature of which cooperate to establish a particular identification for said element distinguishing it from other information-carrying elements of the same apparatus, said element being divided into a plurality of code zones similarly subdivided into a plurality of coding locations, the order of the locations in the several zones representing and being determinative of the order of the characters of the coded identification, the total number of locations of each zone representing and being equal to the maximum number of characters occurring in said identification the nature of each character being represented and determined in the code by a predetermined pairing of two of said zones.

8. An information-carrying element as in claim 7 wherein like markings are provided at like locations in paired zones to establish, by relation to markings made in similar fashion in other paired zones, said order, total number, and nature of the several characters making up the full identification of the element.

9. An information-carrying element as in claim 8 wherein the several characters making up the identification of said element comprise the numerals 0 through 9 whereby the identification is established as a multidigit number, the several locations in each zone being established in a predetermined, constantly maintained order in which one location of each zone corresponds at all times to the first digit of the number and another location of each zone corresponds to the second digit of the number, each zone location bearing a direct correspondence in such manner to a different digit of the number in the sense of the order in which the digits occur in the number.

10. An information-carrying element as in claim 9 wherein the zone locations are arranged in numeric order in each zone, each zone location corresponding, in respect to its place in the order, to the digit occuring at the same place in the identifying number.

11. An information-carrying element as in claim 10 wherein said locations are arranged in a row along an edge of the element, said markings being in the form of notches opening upon said edge.

References Cited

UNITED STATES PATENTS

| | | | |
|---|---|---|---|
| 1,615,997 | 2/1927 | Neiman | 129—16.1 |
| 2,213,184 | 9/1940 | Andrews | 235—61.12 |
| 2,342,517 | 2/1944 | Nevin | 235—61.12 |
| 2,371,008 | 3/1945 | Whittlesey | 235—61.12 |
| 2,392,082 | 1/1946 | Curtis | 235—61.12 |

MAYNARD R. WILBUR, *Primary Examiner.*

DARYL W. COOK, *Examiner.*

W. J. KOPACZ, *Assistant Examiner.*